May 18, 1943. S. L. CLUETT ET AL 2,319,210
MANUFACTURE OF COLLARS AND THE LIKE
Filed April 18, 1940 7 Sheets-Sheet 4

Inventors
Sanford L. Cluett
George A. Schreiner
by Roberts, Cushman & Woodbury
Att'ys.

May 18, 1943.    S. L. CLUETT ET AL    2,319,210
MANUFACTURE OF COLLARS AND THE LIKE
Filed April 18, 1940    7 Sheets-Sheet 5

Inventors
Sanford L. Cluett
George A. Schreiner
by Roberts, Cushman Woodbury
Att'ys.

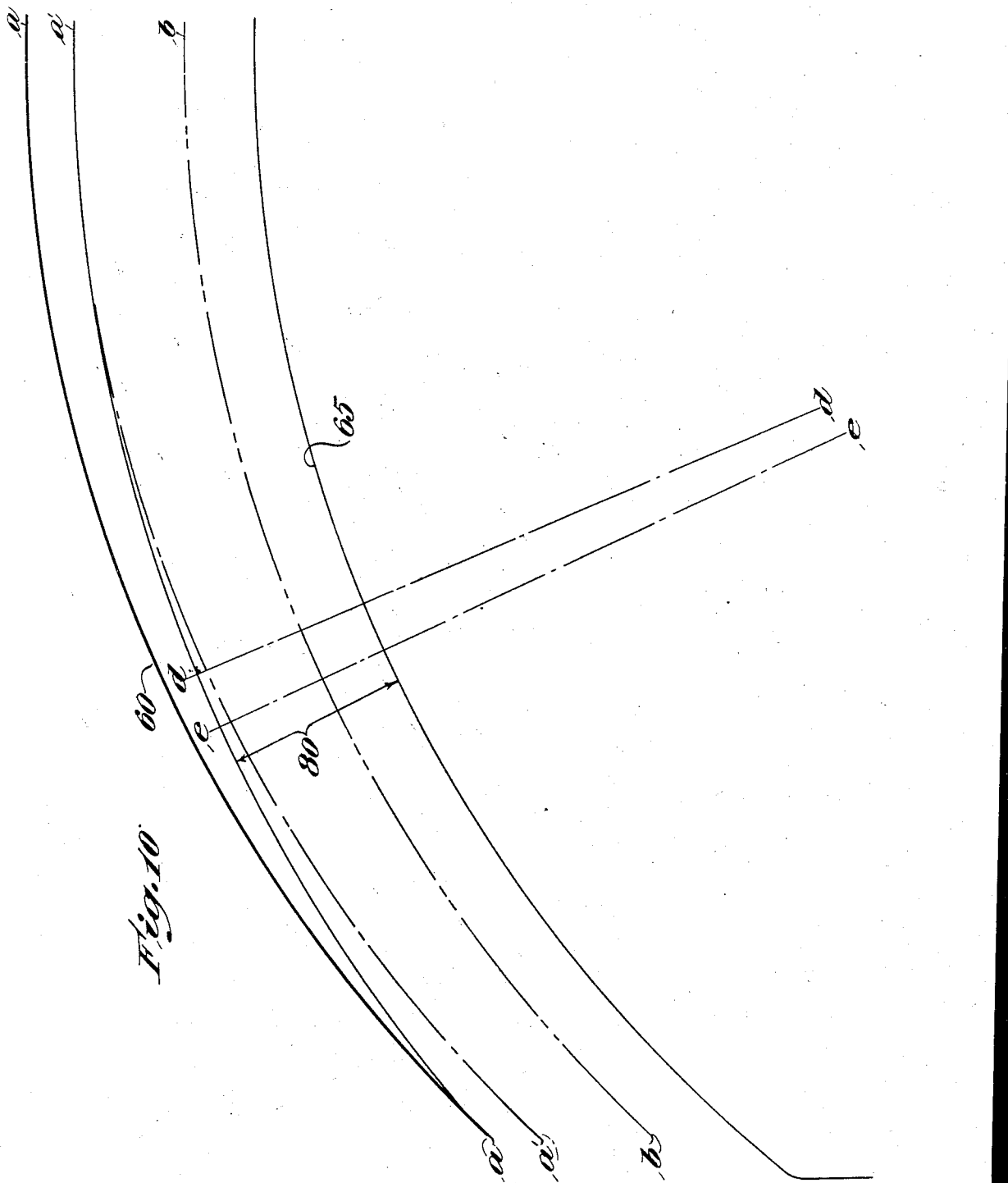

Patented May 18, 1943

2,319,210

UNITED STATES PATENT OFFICE 2,319,210

MANUFACTURE OF COLLARS AND THE LIKE

Sanford L. Cluett and George A. Schreiner, Troy, N. Y., assignors to Cluett, Peabody & Co., Inc., Troy, N. Y., a corporation of New York Application April 18, 1940, Serial No. 330,290

25 Claims. (Cl. 223—2)

This invention relates to the manufacture of collars and more particularly to soft or partially soft collars of the kind which are attached to shirts. The invention may also be applied to analogous garments or parts of garments, but is herein described as applied to collars because the problem of securing accurate fit is probably more acute in the case of collars attached to shirts than in any other part of a garment.

Through a series of experiments it develops that while laundry shrinkage of most every part of a shirt can be effectively prevented by making the shirt of an already shrunk fabric, a special problem arises in the case of a collar of the type customarily attached to the shirt. Here, although the collar be made mainly or entirely of previously completely shrunk fabric, much trouble has been experienced with the collars shrinking in the first laundering after use.

One important cause of this difficulty arises from the several rows of stitches which are a part of the collar, and which are used for such purposes as to fasten or bind the several layers of the collar, to secure the edge seams, and in some cases partially for stiffening or ornamentation, or both. The thread with which the stitches are formed tends to shrink when the collar is first laundered after use, and under the influence of water the shape of the stitches also alters in such a way as to draw the included fabric together longitudinally of the rows of stitches. In most garments these actions have little effect on the size of the garment, but in a collar or collar band, the concentration of a considerable amount of stitching within a relatively small strip of fabric tends to cause objectionable shrinking when the collar is laundered.

A further contributing cause of the difficulty appears to be the tendency of some fabrics, especially those having a relatively loose weave, to elongate when damp, particularly when being handled as in the final ironing operation on the collar. Elongation of this type, due to dampness and handling, will be reflected in a corresponding shrinkage when the shirt is fully laundered after use.

Still another factor increasing shrinkage in laundering is present in the case of collars having a fused interlining in the collar top. In this case, during the handling of the shirt in the dampening and ironing, the stiffness of collar top due to the fused stiffener apparently causes strains in the adjoining parts of the collar and band which tend to elongate these parts.

With the many different designs of collars, varying degrees of potential shrinkage are introduced due to these or other causes.

The present invention avoids these difficulties and provides a collar which will not shrink when laundered after use, by means of a new process. In this process the manufactured collar, containing most or all of its ultimate stitching, and either alone or after attachment to a shirt, is subjected to a mechanical action which not only shortens the collar as a whole, but causes the longitudinal rows of stitching and the portions of fabric penetrated by the stitching to relax and contract endwise to a dimension approximately such as these stitchings and fabric would assume if the collar were laundered. Obviously various mechanisms can be used to secure the longitudinal contraction of the collar and its longitudinal stitchings or this contraction can be secured to some degree by manual manipulation, while the collar can be fixed in this condition by various forms of presses, ironers, or the like.

Two forms of mechanism forming a part of the invention and adapted for use in practising the novel process are illustrated in the drawings, wherein Fig. 1 is a front elevation of a press having mechanism for causing the desired longitudinal contraction of a collar and its stitching;

Fig. 10 is a diagrammatic view on a larger scale showing the action of the head of the press in compressing the material of the bed and the collar.

Figure 1:
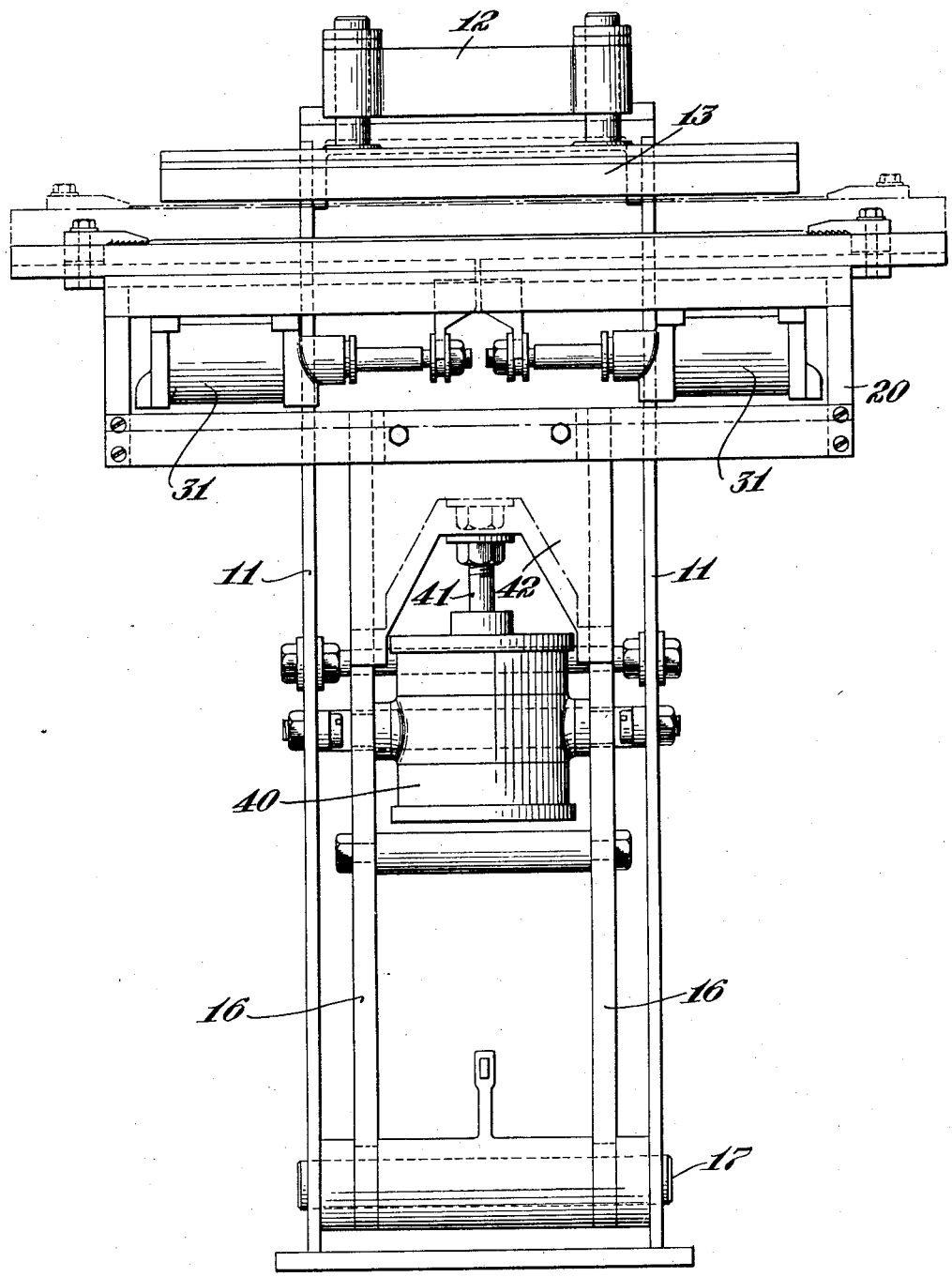

By way of example, let it be assumed that a given lot of shirts having attached collars of say size 15½ have been made. Further let it be assumed that these collars have been correctly cut and contain enough material so that they will never shrink in laundering to a size less than represented by 15½ inches distance from the button to the buttonhole. To this end, the laying out and cutting of the collars should involve the use of accurately determined patterns which make the necessary allowance for every factor which would tend to cause shrinkage of the finished collar in laundering, that is, patterns which are sufficiently larger than the marked size to allow for whatever shrinkage will occur after cutting out. Now, assuming that the lot of size 15½ collars have been correctly cut out, sewed and attached to shirts, the collars are ready for further treatment to prevent the occurrence of shrinking in the first laundering of the collar after use.

Reference has been made to the pattern being larger than the marked size of the collar to allow for shrinkage. For example, if in the given lot of collars there are sufficient rows of stitching to cause a shrinkage of ¼" in the collar during laundering, this should be taken into account in laying out the pattern. But it is not sufficient merely to allow the collars to shrink after being sold; they should be so treated prior to sale that they will not shrink thereafter, that is, the shrinkage which has been allowed for in cutting the collars should be anticipated by a shortening action prior to sale. In the case of a potential shrinkage due to the change in shape of the stitching during laundering, it is desirable that the stitching be relaxed and shortened lengthwise an amount sufficient to prevent it from further shortening the collar when the collar is laundered.

Referring to the drawings, wherein a machine for use in practising the process is shown, the machine includes a stationary frame comprising uprights 11 carrying at their tops a cross member 12 in which is mounted a pressing head 13. The head 13 is smooth on its lower surface and preferably electrically heated to an appropriate temperature for pressing a dampened collar.

Figure 2:
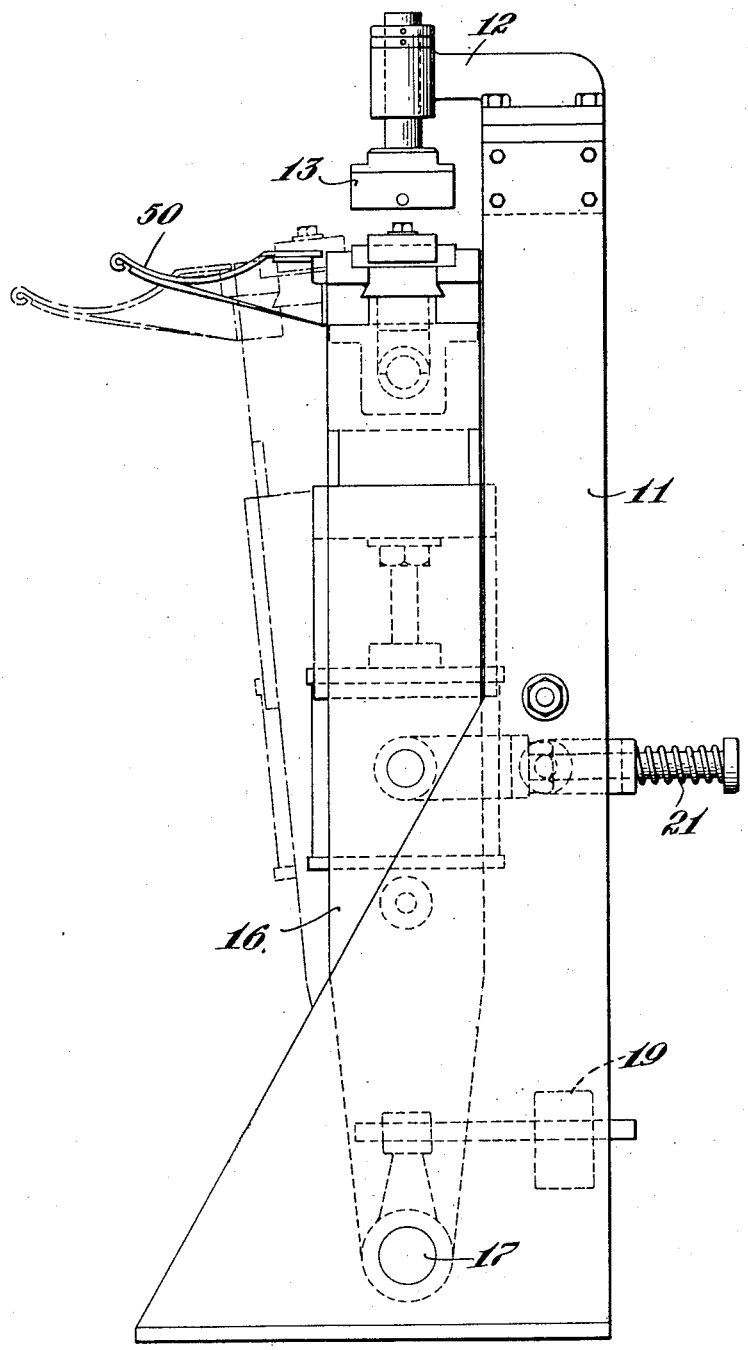
Fig. 2 is a right side elevation of the press of Fig. 1.

The bed of the press and its elevating mechanism are mounted to swing with two swinging members 16 which are pivoted to the frame at 17 and are adapted to be swung out toward the operator to the dotted line position of Fig. 2. A suitable counterweight 19 is adapted to restore the swinging members 16 and the press bed and its associated parts to the full line position of Fig. 2, and a spring 21 is adapted to check the recoil of these parts at this position.

Suitable elevating mechanism for the press bed may comprise, for example, a pneumatic cylinder 40 having a piston of which the piston rod 41 connects with a cross head 42 sliding up and down on the swinging members 16. By suitable and well known valve mechanism, not illustrated, the cylinder 40 can be actuated to raise the cross head and bed up to the dotted line levels of Fig. 1 and to restore these parts to their full line positions.

Figure 3:
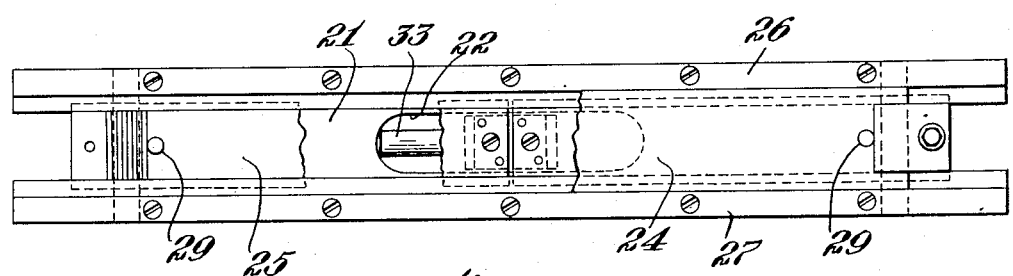
Fig. 3 is a detail in the nature of a plan view of the bed mechanism of the press with portions of the rubber bed element broken away to show underlying parts.
Figure 5:
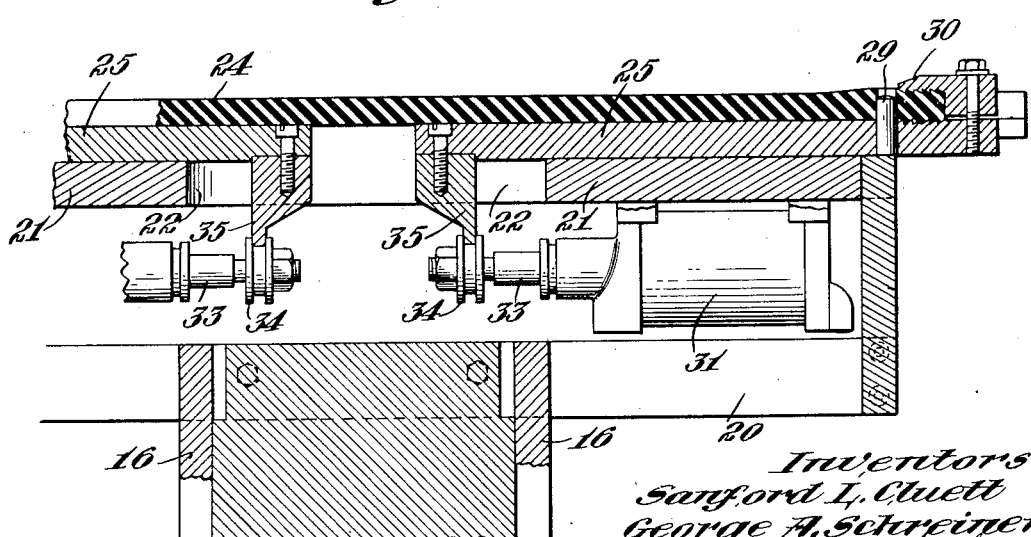
Fig. 5 is a view like Fig. 4 but showing the bed extended.

The bed of the machine is preferably carried by a box-like frame 20 mounted at the top of the cross head 42 and having its top formed of a plate 21 (Fig. 5) slotted in its middle portion at 22. An elastic bed element 24 preferably of rubber rests upon two slides 25 which slide on the plate 21, between lateral guide strips 26 and 27 (Fig. 3). Each end of the rubber bed element 24 is secured to one of the slides 25 by a pin 29 and by a serrated gripping jaw 30 positioned above a correspondingly serrated portion of the slide.

Figure 4:
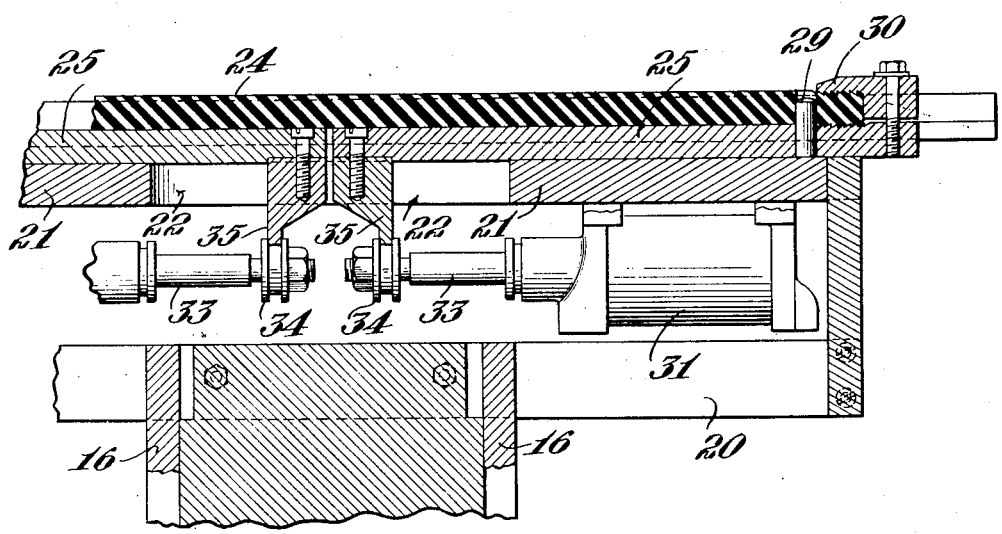
Fig. 4 is a vertical sectional view through the bed mechanism of the press, showing the bed contracted.

The length of the elastic bed element 24 can be changed by suitable means, herein shown as a pair of pneumatic cylinders 31 mounted on the under side of the plate 21. The pistons of these cylinders are provided with piston rods 33 having collets 34 which engage fingers 35 projecting from the slides 25. By suitable and well-known valve mechanism, not illustrated, the pneumatic cylinders can be simultaneously actuated to move the slides 25 outward to any desired degree, for example to the positions of Fig. 5, wherein the rubber bed 24 is substantially elongated from its normal position of Fig. 4.

A suitable tray 50 (Fig. 2) may be mounted in front of the bed to hold the work conveniently, preparatory to pressing.

In operation the bed and associated parts are first swung out to the dotted line position of Fig. 2. The cylinders 31 are then actuated to extend the rubber bed an amount appropriate to the degree to which the collar is to be shrunk, for example to the position of Fig. 5. A dampened collar is then placed on the extended bed, the bed allowed to swing back under the head 13 as shown in full lines in Fig. 2. Then while the bed is still extended cylinder 40 is actuated to press the bed and collar up against the head 13, as shown in dotted lines in Fig. 1.

After the bed and collar are forced against the head 13, the rubber bed is caused to contract by releasing the air pressure in cylinders 31. The rubber of the bed, in contracting, reacts on the collar to force it together endwise, which relaxes the stitches and included fabric, bringing them to a state where laundering will not cause the collar to shorten. The heat and pressure applied by the press fixes the collar in this final condition, while simultaneously applying an ironed finish thereto. Obviously, any previously stretched condition of the collar can be corrected by this treatment, and the collar if previously stretched can be restored to its original cut length or to a shorter length. In fact, any factor tending to cause the collar to shrink during laundering can be offset at this stage by the described treatment. After pressing the collar, the bed and associated parts can be lowered to the full line positions of Fig. 1 by releasing the air pressure from cylinder 40.

Obviously also, the generic method of this invention can be practised by various forms of mechanism or in part by hand by any suitable manual manipulations of the dampened collars such that the lengthwise rows of stitching and the included fabric are caused to relax and draw together generally lengthwise of the collar followed by a pressing of the collar such that the shortened condition of the collar is wholly or partially retained.

Figure 6:
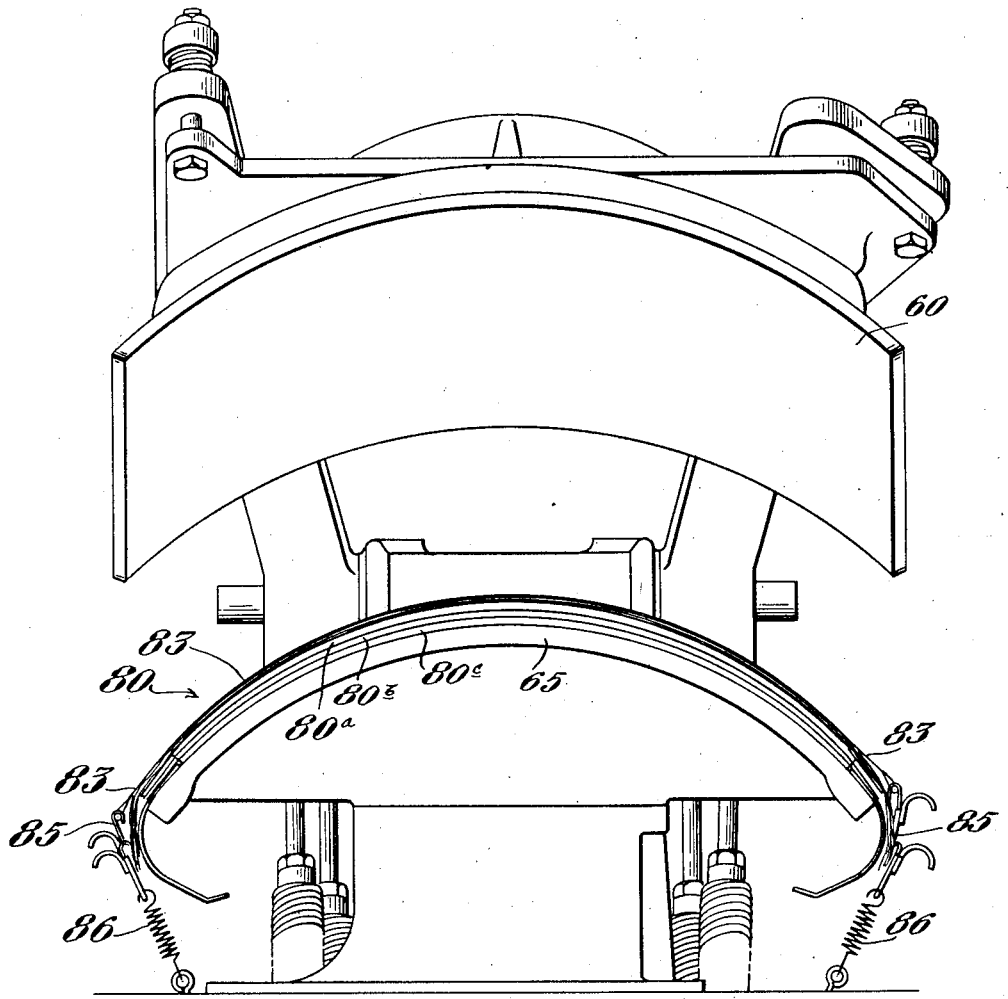
Fig. 6 is a front elevation of another press constituting a preferred embodiment of a press for use in practising the invention.
Figure 7:
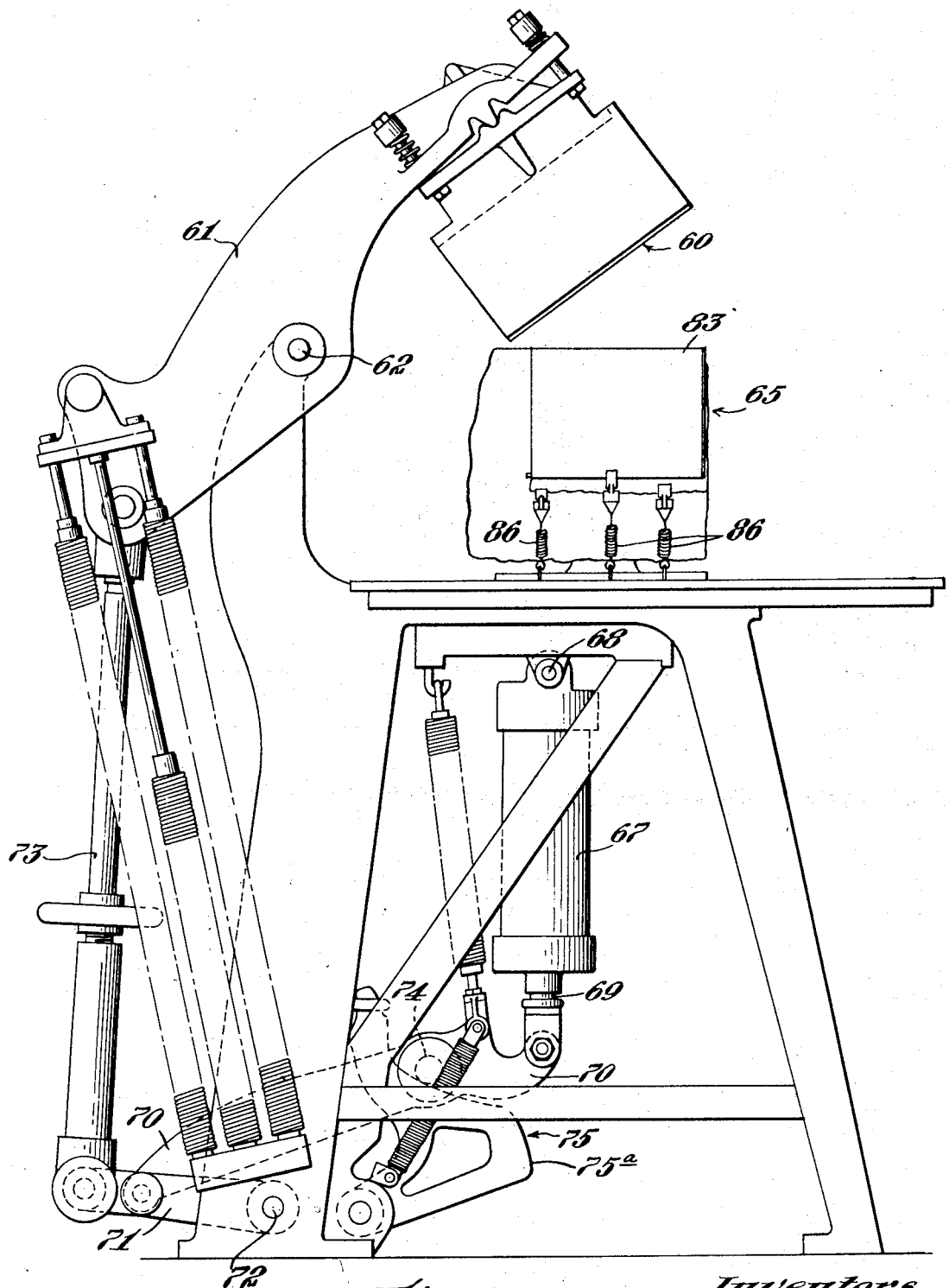
Fig. 7 is a right side elevation of the press of Fig. 6.

Referring particularly to Figs. 6 and 7, the press of these figures includes a heated head 60 mounted on arms 61 which are pivoted at 62, and a buck 65. Both the head 60 and the buck 65 are preferably of cylindrical shape and in a typical instance the convex surface of the buck may have a radius of approximately 12¼ inches, and the concave surface of the head may have a radius of approximately 12¾ inches. The concave surface of the head is highly polished as is usual in this type of press.

For actuating the pivotally mounted head there may be provided the head actuating mechanism described in United States Letters Patent No. 1,688,920. This consists essentially of a pneumatic cylinder 67 pivotally mounted at 68 on the under side of the frame of the press, a plunger 69 operated by the cylinder, a link 70 to which the plunger is pivotally connected, a lever 71 pivoted at 72 and actuable by the link 70, and a lifter rod 73 connected to the arms 61 of the head and adapted to be raised by the link 71. The link 70 when acted on by the plunger 69 is constrained to shift to the right by means of a roller 74 carried by the link 70 and rolling on the surface of a stationary cam 75. The shape of the cam 75 is such that initial downward movement of the plunger 69 quickly forces the link 70 to the right, thus quickly swinging the link 71 in a clockwise direction, raising the lifter rod 73 and swinging the head of the press downwardly.

In prior presses having this type of actuating mechanism, the stationary cam 75 is so shaped that upon the head 60 coming into contact with the collar or other garment to be pressed, the quick movement of the link 70 ceases and further downward movement of the plunger 69 causes only a slow movement of the link 70, lever 71 and lifter rod 73, this slow movement however having the necessary strong force to apply heavy pressure to the collar. In adapting certain prior presses to the practice of the present invention, it has been found desirable to alter the shape of this cam 75 in such manner as to provide a considerably longer movement of the link 70, lever 71 and lifter rod 73 after contact is made between the head 60 and the collar, so that in addition to pressing the collar under considerable pressure, the bed material on which the collar is supported on the buck may be compressed generally radially through a substantial distance relatively slowly but with a relatively strong force, as will be more fully described below.

Thus in the press shown in Fig. 7, cam 75 has been modified from the original form of the cam of the machine by making its portion 75ᵃ less nearly vertical, that is, giving the cam follower 74 and link 70 a longer horizontal movement while in contact with the portion 75ᵃ than in the original machine. It is during the travel of the cam follower 74 over this inclined portion 75ᵃ of the cam that the inward radial compression of the bed takes place, and in order to provide the necessary power for the heavy compression of the bed, it may in some instances be necessary to enlarge the cylinder 67, or else supply more actuating pressure thereto in case the cylinder is adapted to withstand such pressure.

Figure 8:
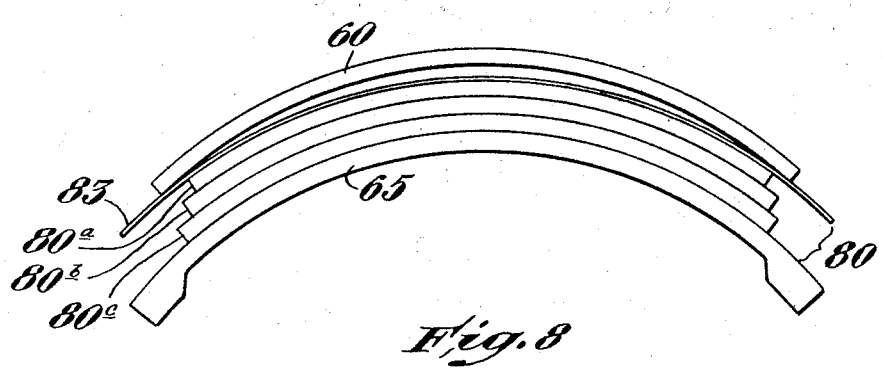
Fig. 8 is a fragmentary front elevation of the press of Fig. 6, showing the head of the press in a partially lowered position such that it has begun to make contact with the bed of the press.
Figure 9:
Fig. 9 is a view similar to Fig. 8 showing the head of the press fully lowered.

Referring to the diagrammatic views of Figs. 8, 9 and 10, the press of Figs. 6 to 10 performs its collar shrinking operation by compressing the bed in such manner that its initially curved surface is forced inwardly with a generally radial motion. Each small arc of such curved surface of the bed throughout the region occupied by the collar is moved radially inwardly and forced to assume a shorter length of arc. In this manner a collar lying on the surface of the bed, and then firmly pressed thereagainst by the head, assumes upon further downward movement of the head, a shorter length, due to the shortening of the underlying surface of the compressible bed.

In carrying out this method, the surface of the bed should be forced inwardly to a sufficient extent along sufficiently converging approximately radial lines that the portion of the surface of the bed to which the collar is initially affixed by pressure will contract the requisite amount. In practice in treating a typical kind of collar, it may be desirable that an 18 inch length of the bed surface should contract to approximately $17\frac{5}{16}$ inches (which is equivalent to about 3.8%) during the downward pressing movement of the head. The degree of contraction can be decreased by employing a less thickness of the compressible material of the bed, or can be increased by employing a greater thickness of the compressible material.

Referring to Fig. 6, a preferred material for the compressible bed which is indicated generally by the reference numeral 80 consists of a plurality of layers of metal wool padding, preferably steel wool, indicated therein at 80ᵃ, 80ᵇ and 80ᶜ, covered by any suitable fabric covering layers 83 held fairly taut over the steel wool by clamps 85 and springs 86 but not affixed to the steel wool. In a typical instance where the buck 65 has a radius of $12\frac{1}{2}$ inches the total thickness of the three steel wool layers 80ᵃ, 80ᵇ and 80ᶜ and the covering fabric may be approximately $1\frac{7}{8}$ inches. Each of the separate layers of the padding is preferably composed of bundles of steel wool constituting wefts, held together by knitted loops of longitudinally or warpwise extending binding wire, the padding being so disposed in the press that the bundles of steel wool extend from front to back of the press, i. e., transversely to the length of a collar to be shrunk in the press. This construction of padding is preferred because of its ready compressibility both lengthwise and radially, coupled with its ability to resume its original shape and size when the pressure of the head is released, and its porosity which facilitates drying the collar.

Referring to Fig. 8, which shows the head in a position where it has begun to make contact with the bed of the press, since the radius of the surface of the padded base is substantially greater than that of the surface of the head of the press, the head first makes contact with the surface of the padded base at the lateral edges of the head. This is preferred, in order that the head shall contact the end portions of the collar before contacting the central portion. As the head is forced downwardly still more, complete contact is made as indicated in Fig. 9, the entire collar which is interposed between the head and base being by this time under pressure.

Further downward movement of the head still further compresses the padded bed radially. In Fig. 10, the full line outline a—a of the head 60 and the broken-line outline a—a' of the bed 80 show these parts at the moment the head first makes contact with the bed, at the point a. The dotted-line outline a'—a' shows the positions of the head and surface of the bed when contact between these parts has first been fully made throughout the area of the head. The further downward movement of the head then carries it and the surface of the bed (and the collar which is being pressed) to a position such as shown in the dotted-line outline b—b of Fig. 10.

During the downward movement of the head all portions of the circular surface of the bed which come under the pressure of the head are forced inwardly along generally radial lines. Thus the arc intersected on the outline a—a' of the bed surface by the approximately radial lines d—d and e—e may for example be one-half inch. This one-half inch of length of the bed surface may be shortened in a typical case to approximately 0.48 inch at the lower position of the bed surface represented by the outline b—b, as may be sen by the arc intersected by the lines d—d and e—e on the outline b—b. This contraction takes place approximately uniformly throughout the circular surface of the bed. Thus, when some slight slippage of the collar on the bed is taken into account, it is well within the shrinking capacity of the bed surface when compressed to this extent to shrink a typical collar ¼ inch in length. The continued pressure of the head upon the contracted collar serves to dry the collar and fix it in its shrunken condition.

The layer or layers of fabric 83 which overlie the compressible steel-wool pads, and on which the collar lies, naturally partake of the longitudinal contraction of the surface of the steel-wool padding. In this connection, the springs 86 which act on the layer or layers of fabric 83 pull the fabric out again to its full length when the head leaves the collar after each shrinking operation. This is desirable in preventing the fabric 83 from becoming longitudinally compacted to a longitudinally incompressible state as a result of the successive contractions of the compressible surface.

The press of Figs. 6 to 10 may be employed in the same general manner as the press of Figs. 1 to 5 to produce a finished collar that will not shrink in laundering. For example a given lot of collars may have been correctly cut and contain enough material so that they will not shrink in laundering to a size less than represented by 15½ inches distance from the button to the button-hole, but have a greater length than the desired 15½ inches either because of the action of the longitudinal rows of stitching or because allowance has had to be made for inherent tendency of the cloth to shrink, or through both of these causes. In such case the collars are dampened and during the pressing in the press are shrunk an amount sufficient to bring them to the desired 15½ inch dimension, whereupon they will not shrink in laundering.

In the specification and claims it is intended to include within the meaning of the word "collar" such analogous parts as collar bands and neckbands.

We claim:

1. Method of manufacturing collars comprising cutting out the constituent parts of the collar, using sufficient fabric for said parts so that when laundered the collar will not shrink below a certain longitudinal dimension, assembling the collar parts, and applying longitudinal rows of stitches to the collar, then applying longitudinal pressure to the collar as a whole while allowing the longitudinal rows of stitches and the fabric included thereby to draw together lengthwise to an extent such that the collar attains substantially the aforesaid longitudinal dimension, and pressing the collar in this condition.

2. Method of manufacturing collars comprising cutting out the constituent parts of the collar, using sufficient fabric for said parts so that when laundered the collar will not shrink below a certain longitudinal dimension, assembling the collar parts, and applying longitudinal rows of stitches to the collar, then dampening the collar and applying longitudinal pressure to the collar as a whole while allowing the longitudinal rows of stitches and the fabric included thereby to draw together lengthwise to an extent such that the collar attains substantially the aforesaid longitudinal dimension, and pressing the collar in this condition.

3. Method of manufacturing collars comprising cutting out the constituent parts of the collar, using sufficient fabric for said parts so that when laundered the collar will not shrink below a certain longitudinal dimension, assembling the collar parts, and applying longitudinal rows of stitches to the collar, pressing the collar, and during the pressing causing the longitudinal rows of stitches and the fabric included thereby to draw together lengthwise to an extent such that the collar attains substantially the aforesaid longitudinal dimension.

4. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, applying the collar to a bed of compressible material of which the surface has a cross section corresponding approximately to the arc of a circle, and pressing the collar under pressure sufficient to force the collar and the corresponding surface portion of the bed inwardly along approximately radial lines sufficiently to cause the collar to contract to approximately said longitudinal dimension.

5. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, applying the collar to a compressible bed of which the surface has a cross section corresponding approximately to the arc of a circle, pressing the collar under pressure sufficient to force the collar and the corresponding surface portion of the bed inwardly along approximately radial lines sufficient to cause the collar to contract to approximately said longitudinal dimension, and retaining the contracted collar under the influence of heat and pressure to substantially fix it in its said longitudinal dimension.

6. Method of manufacturing collars comprising cutting out the constituent parts of the collar, using sufficient fabric for said parts so that when laundered the collar will not shrink below a certain longitudinal dimension, assembling the collar parts, and applying longitudinal rows of stitches to the collar, applying the collar to a bed of compressible material of which the surface has a cross section corresponding approximately to the arc of a circle, pressing the collar under pressure sufficient to force the collar and the corresponding surface portion of the bed inwardly along approximately radial lines sufficiently to cause the collar to contract to approximately said longitudinal dimension, and retaining the contracted collar under the influence of heat and pressure to substantially fix it in its said longitudinal dimension.

7. A collar press for finishing collars comprising opposed pressure members adapted to be separated to receive the collar portion of a collar-attached shirt between them, the surface of one of said pressure members being longitudinally contractible simultaneously throughout its collar-receiving area while forcing the collar against the other pressure member, the surface of said other pressure member being smooth, means for forcing said pressure members together to press the collar, said pressure members both making contact with the collar substantially throughout the length of the collar during the pressing, means for causing said contractible surface of the one pressure member to contract longitudinally of the said collar while pressing the collar against the other pressure member and means for restoring the said contractible surface to its longitudinally uncontracted condition when the said pressure members are separated.

8. A collar press for finishing collars comprising opposed pressure members adapted to be separated to receive the collar portion of a collar-attached shirt between them, the surface of one of said pressure members being longitudinally contractible simultaneously throughout its collar-receiving area while forcing the collar against the other pressure member, the surface of said other pressure member being smooth, and one of said pressure members being a heated element, means for forcing said pressure members together to press the collar, said pressure members both making contact with the collar substantially throughout the length of the collar during the pressing, means for causing said contractible surface of the one pressure member to contract longitudinally of the said collar while pressing the collar against the other pressure member and means for restoring the said contractible surface to its longitudinally uncontracted condition when the said pressure members are separated.

9. A collar press for finishing collars comprising opposed pressure members adapted to be separated to receive the collar portion of a collar-attached shirt between them, one of said pressure members being porous and having its surface longitudinally contractible throughout its collar-receiving area, and the other of said pressure members being a heated element having a smooth surface, said pressure members both making contact with the collar substantially throughout the length of the collar during the pressing, means for forcing said pressure members together to press the collar, means for causing said contractible surface of the one pressure member to contract longitudinally of the said collar simultaneously throughout said collar-receiving area while pressing the collar against the other pressure member and means for restoring the said contractible surface to its longitudinally uncontracted condition when the said pressure members are separated.

10. A collar press for finishing collars comprising opposed pressure means adapted to be separated to receive the collar portion of a collar-attached shirt between them, one of said pressure means including a surface element which is extensible and contractible throughout its collar-receiving area, the other pressure means having a smooth surface, said pressure members both making contact with the collar portion substantially throughout the length of the collar during the pressing with the said collar portion extending longitudinally of the said contractible surface element, means for forcing the pressure means together to press the collar, and means for causing said surface element to contract longitudinally of the said surface element simultaneously throughout said collar-receiving area while said pressure means are forced together and means for restoring the said contractible surface to its longitudinally uncontracted condition when the said pressure means are separated.

11. A collar press for finishing collars comprising a head and a bed relatively movable with respect to each other to receive and press the collar portion of a collar-attached shirt between them, the head and the bed having surfaces having cross sections corresponding approximately to arcs of circles, the bed being contractible generally radially of its surface under the influence of the pressure of the head, the inward generally radial movement of the surface of the bed being sufficient materially to shorten the surface of the bed longitudinally of the said collar, thereby to shrink a collar during the pressing and means for restoring the surface of the bed to its longitudinally uncontracted condition when the head and bed are separated.

12. A collar press for finishing collars comprising a head and a bed relatively movable with respect to each other to receive and press the collar portion of a collar-attached shirt between them, the head and the bed having surfaces having cross sections corresponding approximately to arcs of circles, the bed being contractible generally radially of its surface under the influence of the pressure of the head, the inward generally radial movement of the surface of the bed being sufficient to shorten the surface of the bed at least approximately two per cent or more longitudinally of the said bed with the said collar portion extending longitudinally of said bed, thereby to shrink a collar during the pressing, and means for restoring the surface of the bed to its longitudinally uncontracted condition when the head and bed are separated.

13. A collar press for finishing collars comprising a head and a bed relatively movable with respect to each other to receive and press a collar between them, the head and the bed having surfaces having cross sections corresponding approximately to arcs of circles, the bed being contractible generally radially of its surface under the influence of the pressure of the head, the inward generally radial movement of the surface of the bed being sufficient materially to shorten the surface of the bed, a covering of sheet material for the bed and tensioning means effective to put the covering in a state of tension when the head is out of pressing relation to the bed.

14. A collar press for finishing collars comprising a head and a bed relatively movable with respect to each other to receive and press a collar between them, the head and the bed having surfaces having cross sections corresponding approximately to arcs of circles, the bed being contractible generally radially of its surface under the influence of the pressure of the head, the inward generally radial movement of the surface of the bed being sufficient materially to shorten the surface of the bed, the radius of the surface of the bed being substantially larger than the radius of the cooperating surface of the head.

15. A collar press for finishing collars comprising a buck and a head relatively movable with respect to each other to press the collar portion of a collar-attached shirt, the buck and the head each having surfaces having cross-sections corresponding approximately to arcs of circles, and a padding on the buck of material capable of being compressed both longitudinally and normally of its surface and resiliently resistant to such compression, the curvature of the head and the thickness of the padding being sufficient so that the approximately radial compression of the padding under the pressure of the head materially shortens the surface of the padding longitudinally of the said padding with the collar portion extending longitudinally of said padding, thereby to shrink a collar during the pressing.

16. A collar press for finishing collars comprising a buck and a head relatively movable with respect to each other to press the collar portion of a collar-attached shirt, the buck and the head each having surfaces having cross sections corresponding approximately to arcs of circles, and a padding on the buck of material capable of being compressed both longitudinally and normally of its surface and resiliently resistant to such compression, the curvature of the head and the thickness of the padding being sufficient so that the approximately radial compression of the padding under the pressure of the head shortens the surface of the padding at least approximately three per cent or more longitudinally of the said padding with the collar portion extending longitudinally of said padding, thereby to shrink a collar during the pressing.

17. A collar press for finishing collars comprising a buck and head relatively movable with respect to each other to press a collar, the buck and the head each having surfaces having cross sections corresponding approximately to arcs of circles, and a padding on the buck of material capable of being compressed both longitudinally and normally of its surface and resiliently resistant to such compression, the curvature of the head and the thickness of the padding being sufficient so that the approximately radial compression of the padding under the pressure of the head materially shortens the surface of the padding, a fabric covering for the padding, and tensioning means effective to put the covering in a state of tension when the head is out of pressing relation to the padding.

18. A collar press for finishing collars comprising a buck and a head relatively movable with respect to each other to press a collar, the buck and the head each having surfaces having cross sections corresponding approximately to arcs of circles, and a padding on the buck of material capable of being compressed both longitudinally and normally of its surface and resiliently resistant to such compression, the curvature of the head and the thickness of the padding being sufficient so that the approximately radial compression of the padding under the pressure of the head materially shortens the surface of the padding, a fabric covering for the padding and separable therefrom, and tensioning means effective to put the covering in a state of tension when the head is out of pressing relation to the padding.

19. A collar press for finishing collars comprising a buck and a head relatively movable with respect to each other to press a collar, the buck and the head each having surfaces having cross sections corresponding approximately to arcs of circles, and a padding on the buck of material capable of being compressed both longitudinally and normally of its surface and resiliently resistant to such compression, the padding including a plurality of transversely extending bundles of metallic wool secured by longitudinally extending strands, the curvature of the head and the thickness of the padding being sufficient so that the approximately radial compression of the padding under the pressure of the head materially shortens the surface of the padding, thereby to shrink a collar during the pressing.

20. A collar press for finishing collars comprising a buck and a head, relatively movable with respect to each other to press a collar, the buck and the head each having surfaces having cross sections corresponding approximately to arcs of circles, and a padding on the buck of material capable of being compressed both longitudinally and normally of its surface and resiliently resistant to such compression, the curvature of the head, the curvature of the buck, and the thickness of the padding being such that the radius of the surface of the padding is substantially larger than the radius of the cooperating surface of the head.

21. A collar press for finishing collars, comprising a buck and a head movable with respect to the buck to press a collar, the buck and the head having curved surfaces, a padding on the buck of material capable of being compressed both longitudinally and normally of its surface and resiliently resistant to such compression, the curvature of the head and the thickness of the padding being sufficient so that the approximately radial compression of the padding under the pressure of the head materially shortens the surface of the padding, motor means for operating the press, and linkage connected with motor means and the movable head in such manner as to move the head relatively quickly into contact with the padding and thereafter relatively slowly and with strong force substantially throughout the compression of the padding.

22. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, then applying longitudinal pressure to the collar thereby causing the longitudinal rows of stitches and the fabric included thereby to draw together lengthwise to an extent such that the collar attains substantially the aforesaid longitudinal dimension and pressing the collar in this condition, the longitudinal pressure being applied initially to the ends of the collar simultaneously, and subsequently to the remainder of the collar.

23. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, then applying longitudinal pressure to the collar thereby causing the longitudinal rows of stitches and the fabric included thereby to draw together lengthwise to an extent such that the collar attains substantially the aforesaid longitudinal dimension and pressing the collar in this condition, the longitudinal pressure being applied initially to the ends of the collar simultaneously, and subsequently approaching the center of the collar.

24. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, then applying longitudinal pressure to the collar thereby causing the longitudinal rows of stitches and the fabric included thereby to draw together lengthwise to an extent such that the collar attains substantially the aforesaid longitudinal dimension and pressing the collar in this condition, the longitudinal pressure being applied initially to the ends of the collar simultaneously, and subsequently approaching the center of the collar from both ends thereof concomitantly.

25. Method of manufacturing collars comprising cutting out the constituent parts of the collar, using sufficient fabric for said parts so that when laundered the collar will not shrink below a certain longitudinal dimension, assembling the collar parts and applying longitudinal rows of stitches to the collar, then applying longitudinal pressure to the collar thereby causing the longitudinal rows of stitches and the fabric included thereby to draw together lengthwise to an extent such that the collar attains substantially the aforesaid longitudinal dimension and pressing the collar in this condition, the longitudinal pressure being applied initially to the ends of the collar simultaneously and subsequently to the remainder of the collar and the final pressing taking place upon the application of longitudinal pressure to the entire collar.

SANFORD L. CLUETT.
GEORGE A. SCHREINER.